United States Patent
Liu et al.

(10) Patent No.: US 12,067,013 B2
(45) Date of Patent: Aug. 20, 2024

(54) DATA AGGREGATION IN A HIERARCHY FOR QUERY EXECUTION

(71) Applicant: Microsoft Technology Licensing, LLC, Redmond, WA (US)

(72) Inventors: Lengning Liu, Redmond, WA (US); William Mohabbati, Issaquah, WA (US); Joerg Derungs, Zurich (CH); Tanuja Machineni, Redmond, WA (US); Manu Medigesi Shivakumar, Bellevue, WA (US); Siddhesh Ramesh Surve, Bellevue, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

(21) Appl. No.: 17/362,957

(22) Filed: Jun. 29, 2021

(65) Prior Publication Data

US 2022/0414104 A1   Dec. 29, 2022

(51) Int. Cl.
*G06F 16/245* (2019.01)
*G06F 16/242* (2019.01)
*G06F 16/2455* (2019.01)
*G06F 16/28* (2019.01)

(52) U.S. Cl.
CPC ...... *G06F 16/24556* (2019.01); *G06F 16/244* (2019.01); *G06F 16/284* (2019.01)

(58) Field of Classification Search
None
See application file for complete search history.

(56) References Cited

U.S. PATENT DOCUMENTS

| | | | | |
|---|---|---|---|---|
| 7,035,843 B1* | 4/2006 | Bellamkonda | ........ | G06F 16/283 |
| 2006/0294129 A1* | 12/2006 | Stanfill | ............ | G06F 16/24556 |
| | | | | 707/999.102 |
| 2008/0027970 A1* | 1/2008 | Zhuge | ................... | G06F 16/284 |
| | | | | 707/999.102 |
| 2009/0144307 A1* | 6/2009 | Bestgen | ............ | G06F 16/24556 |
| | | | | 707/999.102 |
| 2009/0319546 A1* | 12/2009 | Shaik | ..................... | G06F 16/258 |

(Continued)

FOREIGN PATENT DOCUMENTS

WO   2013172821 A1   11/2013

OTHER PUBLICATIONS

Hierarchical Aggregation for Information Visualization: Overview, Techniques, and Design Guidelines, Elmqvist et al., IEEE Transactions on Visualization and Computer Graphics, vol. 16, No. 3, May/Jun. 2010 (Year: 2010).*

(Continued)

*Primary Examiner* — Augustine K. Obisesan
(74) *Attorney, Agent, or Firm* — Barta Jones, PLLC

(57) ABSTRACT

Systems and methods for controlling data in a hierarchy receive a data query corresponding to data organized within nodes in a data hierarchy, wherein the data hierarchy is defined by a plurality of dimensions. A data traversal of the data hierarchy is performed including a rollup operation between different nodes at different levels of the plurality of dimensions. The rollup operation aggregates data values of the nodes at the different levels. Aggregated values for different nodes at each level are output based on the rollup operation, and the data query is executed using the aggregated values for the different nodes.

20 Claims, 9 Drawing Sheets

(56) References Cited

U.S. PATENT DOCUMENTS

| | | | | |
|---|---|---|---|---|
| 2013/0097189 | A1* | 4/2013 | Cummings | G06F 16/248 707/754 |
| 2013/0332387 | A1* | 12/2013 | Mirra | G06Q 40/06 705/36 R |
| 2014/0081950 | A1* | 3/2014 | Rajan | G06F 16/24549 707/715 |
| 2014/0085307 | A1* | 3/2014 | Lei | G06F 16/26 345/440 |
| 2015/0007115 | A1* | 1/2015 | Kleser | G06F 16/2264 715/854 |
| 2016/0335303 | A1* | 11/2016 | Madhalam | G06F 16/2455 |
| 2016/0350393 | A1* | 12/2016 | Zheng | G06F 16/283 |
| 2016/0378827 | A1* | 12/2016 | Bondalapati | G06F 16/24542 707/718 |
| 2017/0212931 | A1* | 7/2017 | Chen | G06F 16/245 |
| 2018/0018383 | A1 | 1/2018 | Brunel et al. | |
| 2019/0130040 | A1* | 5/2019 | Ma | G06F 16/9038 |
| 2019/0266526 | A1* | 8/2019 | Knuff | G06Q 10/0635 |
| 2019/0317939 | A1* | 10/2019 | Caroli | G06F 16/2264 |
| 2020/0004883 | A1* | 1/2020 | Dimov | G06F 16/9024 |
| 2021/0056104 | A1* | 2/2021 | Tong | G06F 16/2282 |

OTHER PUBLICATIONS

Fast Rollup on Recursive Hierarchy in OLAP, Yuan et al., Proceedings of the 2006 IEEE/WIC/ACM International Conference on Web Intelligence (WI 2006 Main Conference Proceedings)(WI'06) (Year: 2006).*

"GraphFrames User Guide", Retrieved from: https://web.archive.org/web/20201109133317/https://graphframes.github.o/graphframes/docs/_site/user-guide.html, Nov. 9, 2020, 12 pages.

"Multi-Dimensional Aggregation", Retrieved from: https://jaceklaskowski.gitbooks.io/mastering-spark-sql/content/spark-sql-multi-dimensional-aggregation.html, Sep. 19, 2020, 22 Pages.

"International Search Report and Written Opinion Issued in PCT Application No. PCT/US22/029724", Mailed Date: Jul. 14, 2022, 12 Pages.

* cited by examiner

US 12,067,013 B2

DATA AGGREGATION IN A HIERARCHY FOR QUERY EXECUTION

BACKGROUND

Structured query language (SQL) queries of databases often require performing query operations on large data sets. Moreover, these data sets can often be complex and differently configured, thereby making it difficult to provide meaningful or useful results, particularly in an acceptable time frame. For example, when resolving the SQL query using the query instructions on data that is to be retrieved from many entities that refer to one another in cycles (e.g., hierarchies or recursion), computation loops can often be extensive and time consuming even with an appropriate SQL query. Thus, results may not be provided in a satisfactory time period and still may not be meaningful or useful (e.g., results do not provide a complete solution for business intelligence (BI) tasks).

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one or more examples, a computerized method for controlling data in a hierarchy comprises receiving a data query corresponding to data organized within nodes in a data hierarchy, wherein the data hierarchy is defined by a plurality of dimensions. The computerized method further comprises performing a data traversal of the data hierarchy including a rollup operation between different nodes at different levels of the plurality of dimensions. The rollup operation aggregates data values of the nodes at the different levels. The computerized method also comprises outputting aggregated values for different nodes at each level based on the rollup operation, and executing the data query using the aggregated values for the different nodes.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein.

Corresponding reference characters indicate corresponding parts throughout the drawings.

DETAILED DESCRIPTION

Referring to the figures, computing devices and methods described herein are configured to control data in a hierarchy, such as when performing a search (e.g., a structured query language (SQL) search) on a large dataset having many different entities, some of which refer to one another. Various examples model hierarchy data in a business-to-business (B2B) environment that handles the complexity of the hierarchy data and facilitates efficient hierarchy traversal and rollup computations that are common in segments and measures in the B2B environment. In one or more examples described herein, B2B data is modeled to facilitate segment and measure creation in a B2B customer data platform (CDP). This data modeling approach and methodology results in robust, intuitive, and efficient segment and measure definition and computation in various examples.

While some examples describe data modeling built specific to CDP and B2B, aspects of the disclosure are operable in any data hierarchy where modeling provides multiple levels of information. As such, aspects of the disclosure are operable with a space-time continuum for CDP data.

Aspects described herein improve the operations of computing devices at least by using data modeling that is integrated with the underlying compute infrastructure to leverage both the relational database as well as the graph database to handle compute operations. This integration of both relational and graph databases in a single query engine to compute segments and measures results in performance advantages, such as reduced hierarchy aggregation. For example, as a result of providing this functionality and performing the operations described herein, processing time and processing resources when executing queries are reduced in a simplified, robust, and efficient manner. In this manner, when a processor is programmed to perform the operations described herein, the processor is used in an unconventional way, and allows, for example, for the more efficient control of data using less memory and with less processing when executing queries.

Figure 1:
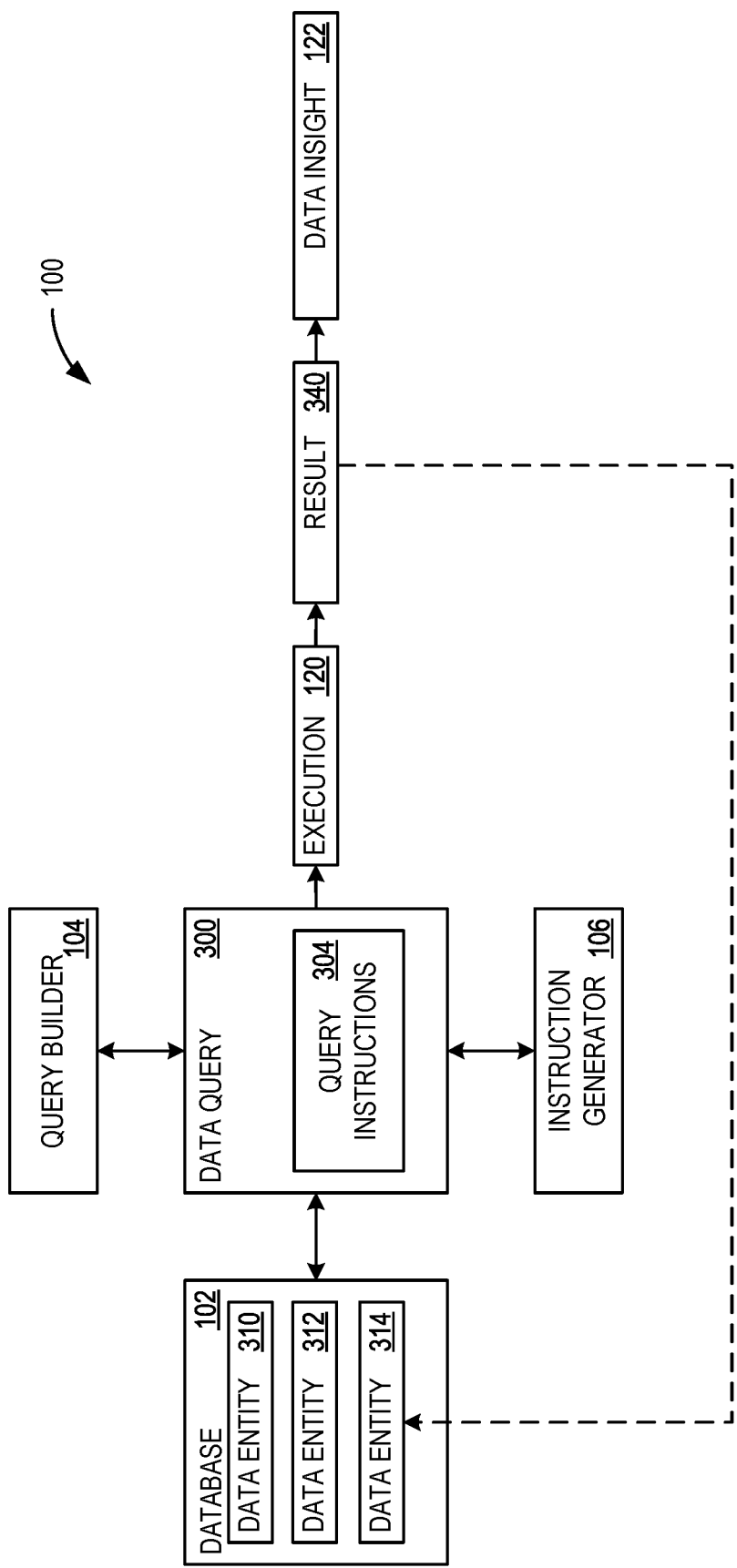
FIG. 1 illustrates an example arrangement for performing data queries.

FIG. 1 illustrates an arrangement 100 for advantageously controlling the processing of data in a hierarchy, such as to perform a data query 300 (e.g., a SQL query). In various examples, the arrangement 100 processes data (in a hierarchy) to perform B2B segment and measure compute operations. However, the herein described examples are implementable in different environments to perform different operations on data having one or more different hierarchies. For example, the arrangement 100 and herein disclosed examples are configured to process data that is more than just tables (e.g., also includes a hierarchy and/or recursion) in order to efficiently rollup the data from the entire hierarchy. For example, one or more B2B features of the arrangement 100 process data that is maintained or organized differently across the dataset, such as maintaining customer/client accounts, organized differently (e.g., differently maintained or organized at different data or office locations, such as customer/client accounts maintained and organized differently in offices at different locations). In various examples, hierarchy aggregation is performed using a process that includes both a vertical rollup (e.g., aggregate different levels in the hierarchy) and a horizontal rollup (e.g., aggregate across each "dimension" in the hierarchy). As a result of using one or more examples of data models and compute algorithms that are configured to perform the rollups, the aggregation process is improved.

The arrangement 100 is implemented in a system to perform a data query, including segment/measure computations in some examples. The arrangement 100 is operable using a computing device 1100 (of FIG. 9) that includes any device executing instructions (e.g., as application programs, operating system functionality, or both) to implement the operations and functionality as described herein, such as the data query 300. In the illustrated example, a database 102 stores multiple data entities, such as a data entity 310 and a data entity 312, which are used in data query 300. In some examples, the database 102 is stored on an example of the computing device 1100. A programmer uses a query builder 104 to construct a graphical representation of the data query 300. An instruction generator 106 converts the data query 300 into query instructions 304, which perform at least one operation (e.g., an operation 306, shown in FIG. 2) on the data entities 310 and 312. In some examples, the query builder 104 and the instruction generator 106 each run on an example of the computing device 1100 (of FIG. 9).

The data entities 310 and 312 include, for example, fact entities, dimension entities, and profile entities. Fact entities represent events, activities, or measures and include fact tables of fact data, such as sales price, sale quantity, and time, distance, speed and weight measurements. In some examples, a fact table is defined as one of three types. A transaction fact table records facts about a specific event (e.g., sales events). A snapshot fact table records facts at a given point in time (e.g., account details at month end). An accumulating snapshot tables records aggregate facts at a given point in time (e.g., total month-to-date sales for a product). Fact tables may generally be assigned a surrogate key to ensure each row can be uniquely identified. This key may be a primary key.

Dimension entities include dimension attributes, such as product models, product colors, product sizes, geographic locations, and salesperson names. Dimension tables usually have a relatively small number of records compared to fact tables, but each record may have a very large number of attributes to describe the fact data. Dimensions may define a wide variety of characteristics, but some of the most common attributes defined by dimension tables include: time dimension tables that describe time at the lowest level of time granularity for which events are recorded; geography dimension tables that describe location data, such as country, state, or city; product dimension tables that describe products; employee dimension tables that describe employees, such as sales people; and range dimension tables that describe ranges of time, dollar values or other measurable quantities to simplify reporting. Dimension tables are generally assigned a surrogate primary key, usually a single-column integer data type, mapped to the combination of dimension attributes that form the natural key. A dimension entity may have a foreign-key relationship to a profile entity or a fact entity. Profile entities may represent people.

An execution module 120 executes the data query 300 on the data entities 310 and 312 to produce a result 340 (e.g., a useful result). In some examples, the execution module 120 runs on the computing device 1100 (of FIG. 9). In various examples, the result 340 is sent to a data insight component 122 for use in business intelligence (BI) tasks. In some examples, the result 340 is stored in the database 102 as a new data entity 324, such that a subsequent data query may use the data entity 324 in further operations (e.g., in a series of computations building up to a final result).

Figure 2:
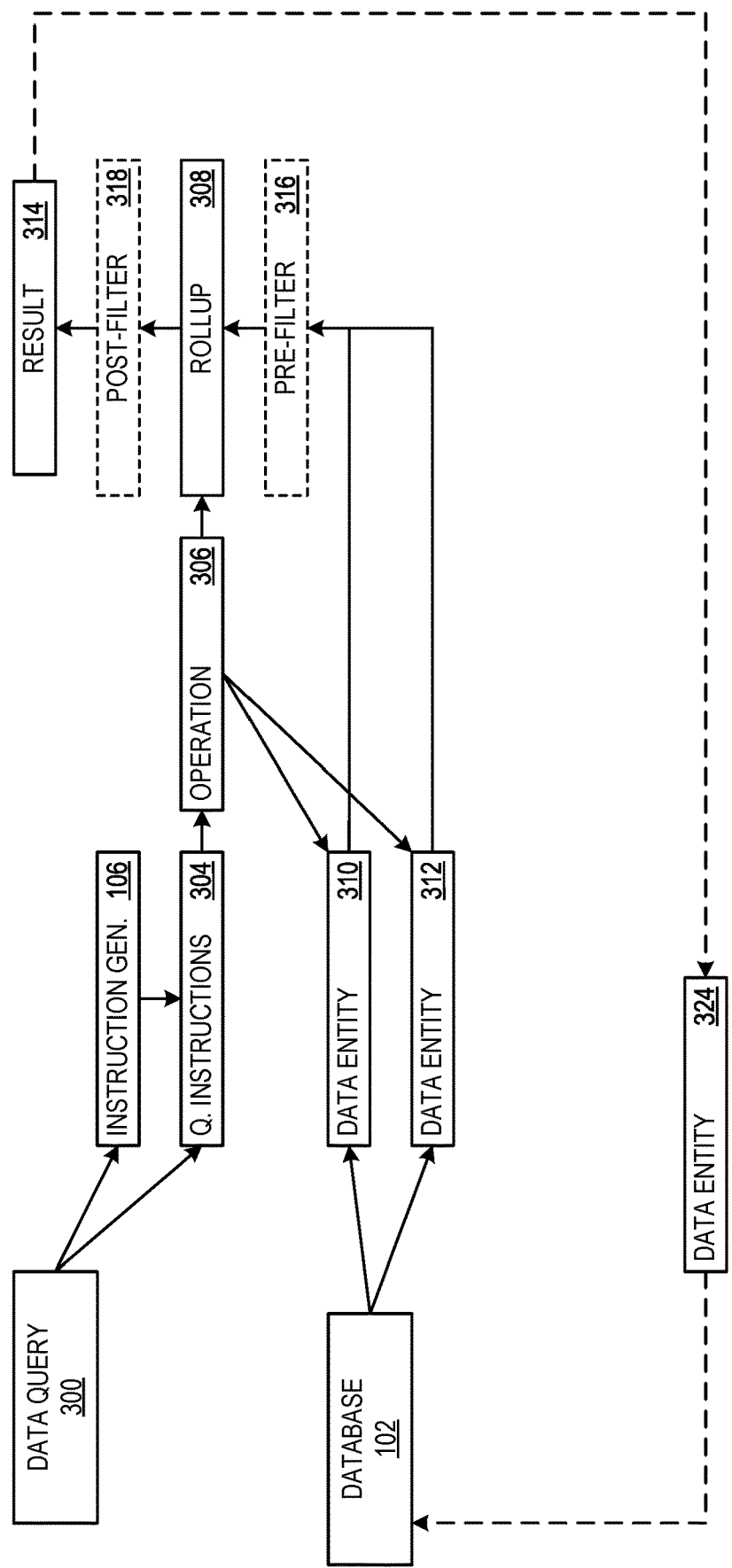
FIG. 2 illustrates an example application of rollup and filtering operations used in a data query.

FIG. 2 illustrates the application of graph traversal of data entities 310 and 312 used in the data query 300. The data query 300 includes query instructions 304 based on a user query input. For example, a user inputs a query using a user interface, and the instruction generator 106 converts the query into query instructions 304. In some examples, the user may also edit the query instructions 304. The query instructions 304 include an operation 306 that operates on the data entities 310 and 312, for example acquires data from the data entities 310 and 312. The data for the data entities 310 and 312 in some examples is obtained (e.g., pulled) from the database 102. It should be noted that different configurations of generating instructions using the instruction generator 106 are contemplated.

In various examples, the data entity 310 and the data entity 312 can be defined by different information, including, without limitation: a name that is unique within a namespace, a list of entity-level traits, a list of attributes, and a list of relations. Attributes describe fields on each record in the entity, and may be represented as columns in a table. In some examples, attributes contain a first name, a second name, a data type, a date, and traits. Traits are properties of the attributes or entities. In some examples, a trait contains a trait name and explanation.

The operation 306 includes performing a rollup 308 as described in more detail herein. For example, the operation 306 provides a result 314 that allows for a SQL rollup query to be performed efficiently. In some examples, a pre-filtering operation 316 and/or a post-filtering operation 318 is optionally performed before or after the rollup 308, respectively, as also described in more detail herein. In one example, the operation 306 is a non-self-joining operation that performs the rollup 308 using one or more data dimensions as described in more detail herein. The execution of the data query 300 thereby produces an aggregated result 314, which is stored in the database 102 as the data entity 324. As should be appreciated, a looping or feedback type of processing is performed in some examples that includes one or more loops of rollup 308 or filtering 316, 318. Thus, in some examples, one or more pre-filter operations are performed, followed by one or more rollup operations, followed by one or more post-filter operations, which then provides one or more outputs as a result. That is, various examples perform a query using one or more measure operations.

Figure 3:
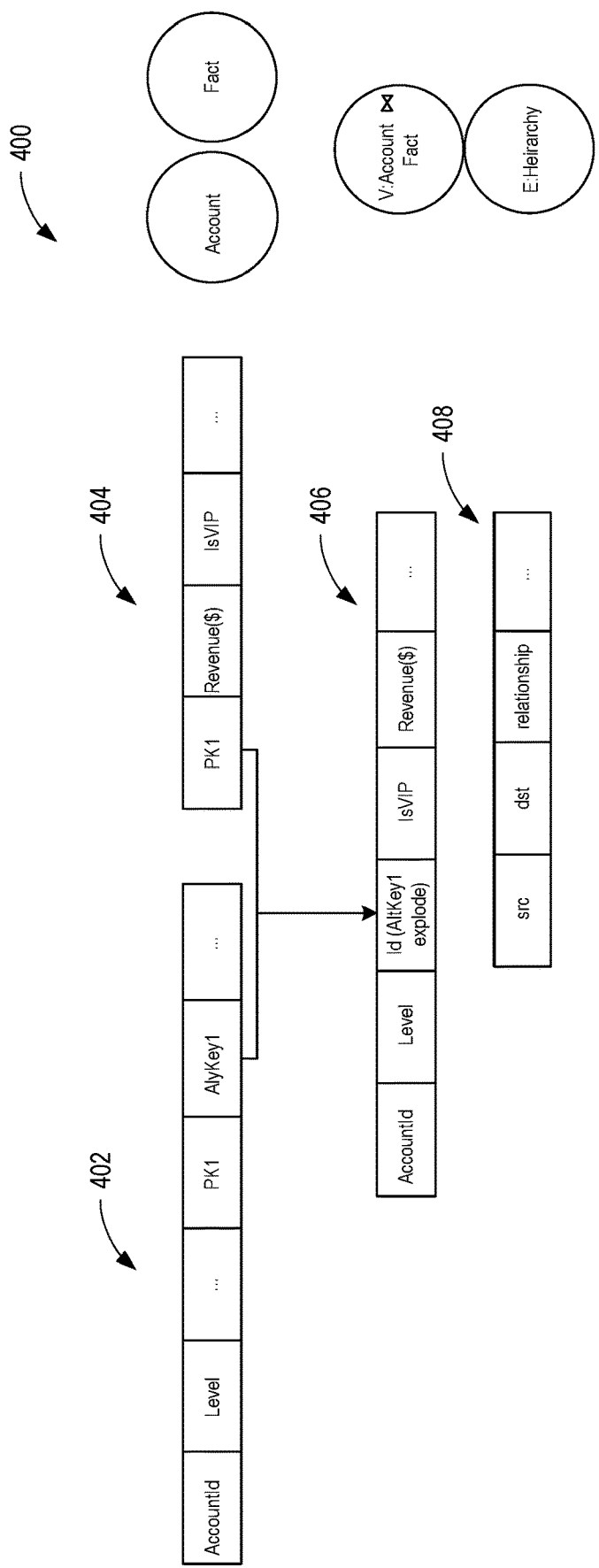
FIG. 3 illustrates example entities having different profiles.

As an example as illustrated in FIG. 3, consider an attempt to perform a join operation 400 of an entity having a first profile 402 with another entity having a different second profile 404 (e.g., profiles corresponding to customer accounts that are organized differently within stored tables or spreadsheets). For example, the entity with the first profile 402 has a customer identification (AccountId), a primary key (PK1) that is one-to-one (1:1), an alternate key (AltKey1) that is one-to-four (1:4), and two attributes (not shown). The other entity with the second profile 404 has a primary key (PK 1) that is 1:1 and two attributes (e.g., VIP status). In some examples, by first rolling up the data (e.g., hierarchy rollup) based on an account (e.g., PK to result in a hierarchy join 406) and then based on a dimension (e.g., an attribute corresponding to a dimension of that entity defined by a dimension column to result in a dimension join 408), a self-joining operation does not have to be performed. That is, a reduced data set is generated to perform, for example, a SQL query by first performing the rollup based on an account (e.g., rollup between levels in the hierarchy) and then a rollup based on one or more dimensions (e.g., rollup within each level of the hierarchy).

When joining the data entities 310 and 312 (e.g., attempting to join the PK and the AltKey key of the first profile 402 into the primary key of the other entity having the second profile 404), one or more of the following are considered:
1. Account to Fact join needs to happen at the AltKey level;
2. Because of the join type, the metric attribute needs to come from a Fact table—aggregation cannot be performed on Account metric attributes (avoid double counting);
3. After all operations are performed, the result is finalized by another group by operation performed on the AccountId (for profile measures) to collapse the aggregation to a unified account level; and
4. Temporal joins can be performed.

In one or more examples, the data hierarchy is traversed based on one of the following operations:

unified account entity+hierarchy⇒pivoted account entity⇒rollups; or unified account entity+hierarchy⇒ graphframe⇒graph queries.

That is, different rollup operations or queries can be performed in the various examples using one or more SQL operators (e.g., Spark SQL operators, such as using one or more Spark SQL API operators for ROLLUP, GROUPING SETS, and CUBE). For example, one or more implementations perform multi-dimensional aggregation using one or more multi-dimensional aggregate operators that are enhanced variants of a groupBy operator that allows for the creation of queries for subtotals, grand totals and superset of subtotals in one operation in some examples. It should be appreciated that the multi-dimensional aggregate operators are semantically equivalent to a union operator (e.g., a SQL UNION ALL operator) to combine single grouping queries in various examples. Thus, the various examples contemplate different approaches and/or operations, such as using SQL PIVOT/ROLLUP/GROUPING SETS/CUBE or using SQL+graph queries.

Examples of the unified account entity+hierarchy⇒pivoted account entity⇒rollups operation will now be described. An example of the rollup operation performed using a SQL script is defined as follows:
1. Selecting measure criteria and/or properties (e.g., revenue);
2. Performing a rollup based on one or more criteria (e.g., city, year, etc.);
3. Performing an aggregation operation that combines summing and grouping;
4. Sorting, grouping, and/or ordering the results from the aggregation operation;
5. Filtering the sorted results;
6. Selecting a desired output format; and
7. Outputting the desired results.

In one example, the rollup operation performed using a SQL script defined as follows:

```
SELECT city, year, SUM(amount) as amount
FROM sales
GROUP BY city, year
GROUPING SETS ((city, year), (city))
ORDER BY city DESC NULLS LAST, year ASC NULLS LAST
```

As should be appreciated, the various operators can be used individually or in a combined query. For example, SQL union and groupBy operators are used individually or independently in different operations in some examples. In other examples, the operators are combined. Different operators can be used within the different measures, such as a GROUPING SETS operator to group sets of data, which allows for horizontal and vertical grouping in a data tree.

In one or more examples, a rollup operator is used on one or more relational grouped datasets.

It should be noted that the rollup multi-dimensional aggregate operator is an extension of the groupBy operator that calculates subtotals and a grand total across specified group of n+1 dimensions (with n being the number of columns as cols and col1 and 1 for where values become null, i.e. undefined). The rollup operator can be used, for example, for analysis over hierarchical data (e.g., total salary by department, division, and company-wide total) by defining and/or setting parameters, such as city, year, amount, etc. It should be noted that the operations can be performed on different values, such as totals, sub-totals, etc.

Thus, in various examples, the ROLLUP operator is used, for example, in generating reports that contain subtotals and totals, wherein the ROLLUP operator generates a result set that shows aggregates for a hierarchy of values in the selected columns (of a table). In some examples, this is a first rollup operation that is performed. Thereafter, a second rollup operation (across the dimension) is performed. For example, the second rollup operation is performed using WITH ROLLUP that is used with the GROUP BY only. The ROLLUP clause is used with GROUP BY to compute the aggregate at the hierarchy levels of a dimension. For example, GROUP BY a, b, c with ROLLUP assumes that the hierarchy is "a" drilling down to "b" drilling down to "c". And, GROUP BY a, b, c, WITH ROLLUP is equivalent to GROUP BY a, b, c GROUPING SETS ((a, b, c), (a, b), (a), ( )).

It should be noted that the individual elements of a ROLLUP clause may be either individual expressions, or sub-lists of elements in parentheses. In the latter case, the sub-lists are treated as single units for the purposes of generating the individual grouping sets. It should also be noted that internally, the ROLLUP operator converts the Dataset into a DataFrame (i.e., uses RowEncoder as the encoder) and then creates a RelationalGroupedDataset (with RollupType group type). In various examples, the ROLLUP expression represents GROUP BY . . . WITH ROLLUP in SQL in Spark's Catalyst Expression tree (after AstBuilder parses a structured query with aggregation).

In some examples, a CUBE operator is used, which is defined within a relational grouped dataset. That is, one or more measures can be performed using the CUBE operator to perform the herein described methods. The CUBE multi-dimensional aggregate operator is an extension of the groupBy operator that allows calculating subtotals and a grand total across all combinations of a specified group of n+1 dimensions (with n being the number of columns as cols and col1 and 1 for where values become null, i.e. undefined). The CUBE operator returns RelationalGroupedDataset that can be used to execute an aggregate function or operator. It should be noted that the CUBE operator is more than a rollup operator (i.e., the CUBE operator does rollup with aggregation over all the missing combinations given the columns). An example of the CUBE operator uses sales data and aggregates the data values in a summing operation, which is then sorted, such as by location, date, etc.

In some examples, a GROUPING SETS SQL clause is used that generates a dataset that is equivalent to the UNION operator of multiple groupBy operators. For example, one or more parameters (e.g., city, year, sum, etc.) are selected from a dataset (e.g., from a sales dataset) and then a grouping is performing on one or more of the parameters, followed by grouping sets of the grouped data, which are then ordered (e.g., by year, etc.), such as defined as follows:

```
SELECT city, year, sum(amount) as amount
FROM sales
GROUP BY city, year
GROUPING SETS ((city, year), (city), ( ))
ORDER BY city DESC NULLS LAST, year ASC NULLS LAST
```

For example, the GROUPING SETS SQL clause can be defined as:

```
SELECT city, year, sum(amount) as amount
FROM sales
GROUP BY city, year
GROUPING SETS ((city, year), (city), (year), ( ))
ORDER BY city DESC NULLS LAST, year ASC NULLS LAST
```

It should be noted that the above is equivalent to cube ("city", "year"). It should also be noted that internally, the GROUPING SETS clause is parsed in with an Aggregation parsing handler (in AstBuilder) and becomes a GroupingSets logical operator internally.

Similarly, examples of the unified account entity+hierarchy⇒graphframe⇒graph queries operation can be performed using different operators. For example, GraphFrames operators can be used to create a vertex and edge DataFrames and thereafter using graph algorithms within the GraphFrames framework, one or more operations described herein are performed. In one or more examples, GraphFrames operators/operations are defined as follows:

1. Combining elements from a list on different levels (as a fold left operation on three lists using one or more GraphFrames APIs):

```
val levels = List(0,1,2)
varresultDf=unifiedAccountDf.groupBy("id").sum("Revenue").withColumnRenamed("sum(Revenue)", "Revenue")
val AM = AggregateMessages
val msgToDst = AM.src("Revenue")
levels.foldLeft(unifiedAccountDf){(tempDf, level) =>
  val tempGraph = GraphFrame(tempDf, hierarchyDf)
  var aggDf = { tempGraph.aggregateMessages
    .sendToDst(msgToDst)
    .agg(sum(AM.msg).as("rolledUpRevenue"+level)) }.
```

2. Rolling up and aggregating across each level:

```
aggDf= aggDf.withColumnRenamed("rolledUpRevenue"+level,"Revenue")
resultDf = resultDf.union(aggDf)
valunifiedAccountRolledUpLevelDf=aggDf.withColumnRenamed("rolledUp
Revenue"+level, "Revenue")
resultDf.show( )
unifiedAccountRolledUpLevelDf.
```

3. Final rolling up and aggregating:

```
val profileMeasureSumRevenue =
  resultDf.groupBy("id").sum("Revenue").withColumnRenamed("sum(Revenue
)","ProfileMeasureSumRevenue")
  profileMeasureSumRevenue.show( ).
```

Figure 4:
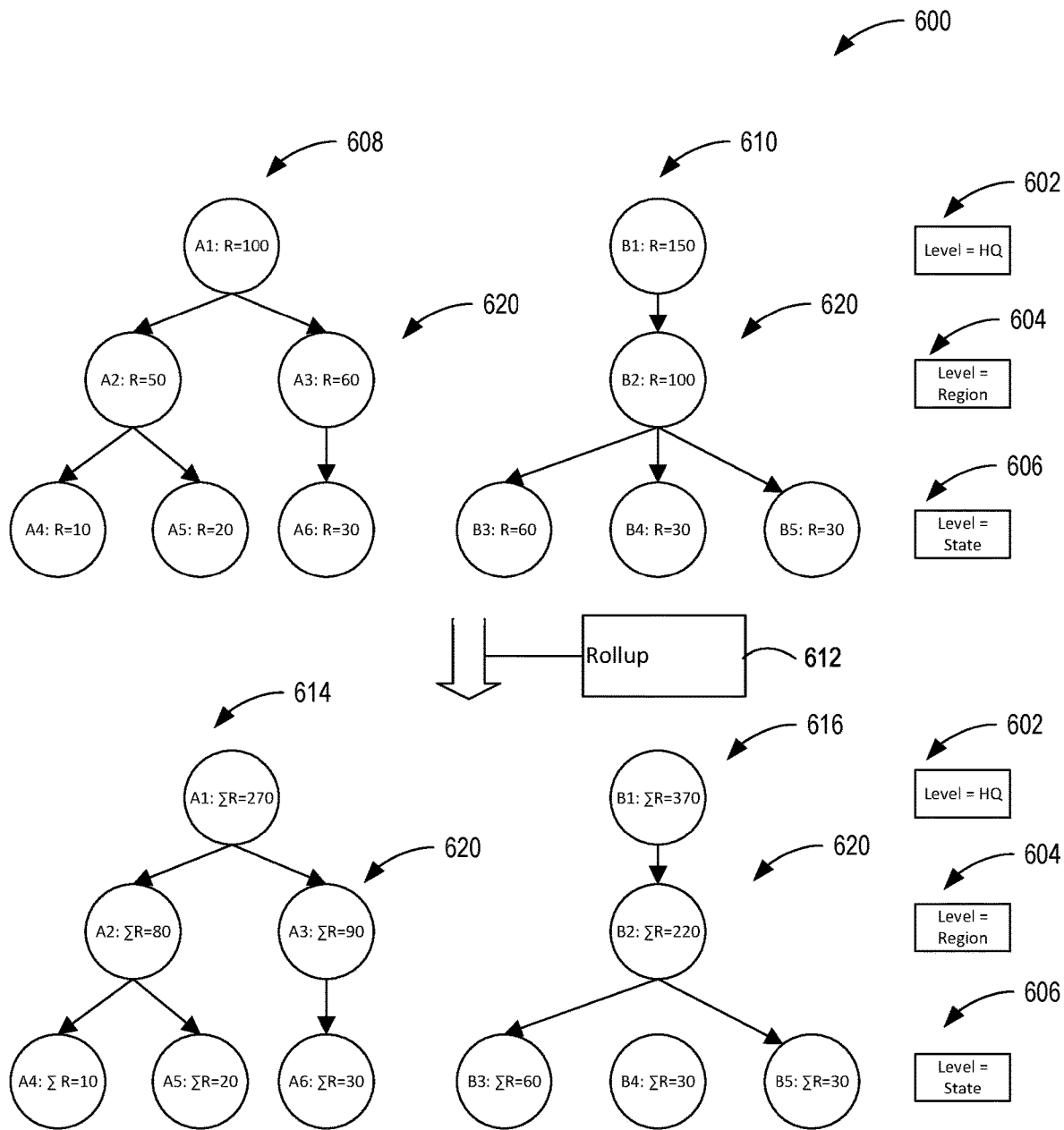
FIG. 4 illustrates an example measure operation.

Various measures and rollup operations will now be described with respect to FIGS. 4-7 that illustrate examples of different measures that can be performed. That is, the examples illustrate hierarchy aggregation to perform different measures. In particular, FIG. 4 illustrates a measure operation 600 that is a profile measure with hierarchy. In this example, the measure operation 600 is a sum of revenue with a rollup to each account. The illustrated hierarchy has three different levels, which are a headquarter (HQ) level 602 (e.g., physical location), a region level 604 and a state level 606. As should be appreciated, the levels 602, 604. 606 are shown merely for illustration and different levels (e.g., level definitions) or sub-levels can be used. It should be noted that the measures illustrated and described herein are merely examples of the types of operations that can be performed. That is, different types of operations for different measures can be performed using the herein described examples. And, the parameters, configurations, etc. used to define and perform the measures can be changed as desired or needed (e.g., different financial or non-financial measures).

In the measure operation 600, a hierarchy 608 and a hierarchy 610 are represented by nodes 620 (A nodes and B nodes) that correspond to revenue (R) data values. As can be seen, the revenue data as the different levels 602, 604, 606 within each of the hierarchies 608, 610 are related to each other as shown with the arrows representing relationships between the nodes 620. The relationships between the nodes 620 in each of the hierarchies 608, 610 of the levels 602, 604, 606 can be different as represented by the different connections (illustrated with the arrows). In this example, a data query is received corresponding to the data organized within the nodes 620 in the hierarchies 608, 610, wherein the data hierarchy is defined by a plurality of dimensions defined by the different levels 602, 604, 606. In one example, a rollup operation 612 is performed between different nodes 620 at the different levels 602, 604, 606 of the plurality of dimensions, wherein the rollup operation 612 aggregates data values of the nodes 620 at the different levels 602, 604, 606. For example, as can be seen in the updated hierarchies 614, 616, the revenue data at the nodes 620 in the level 604 is a sum of the revenue data of the associated nodes 620 at the level 602, and the revenue data at the nodes 620 in the level 606 is a sum of the revenue data of the associated nodes 620 at the level 604. That is, the revenue value of the node(s) 620 of a lower level are summed with the node 620 at the adjacent higher level to which the node(s) 620 in the lower level have a relationship (defined by the arrows). As such, using, for example, the ROLLUP SQL operation described herein, a rollup of revenue data at an account level can be performed. In this example, an aggregated value for the different nodes 620 at each level 602, 604, 606 based on the rollup operation is output.

Figure 5:
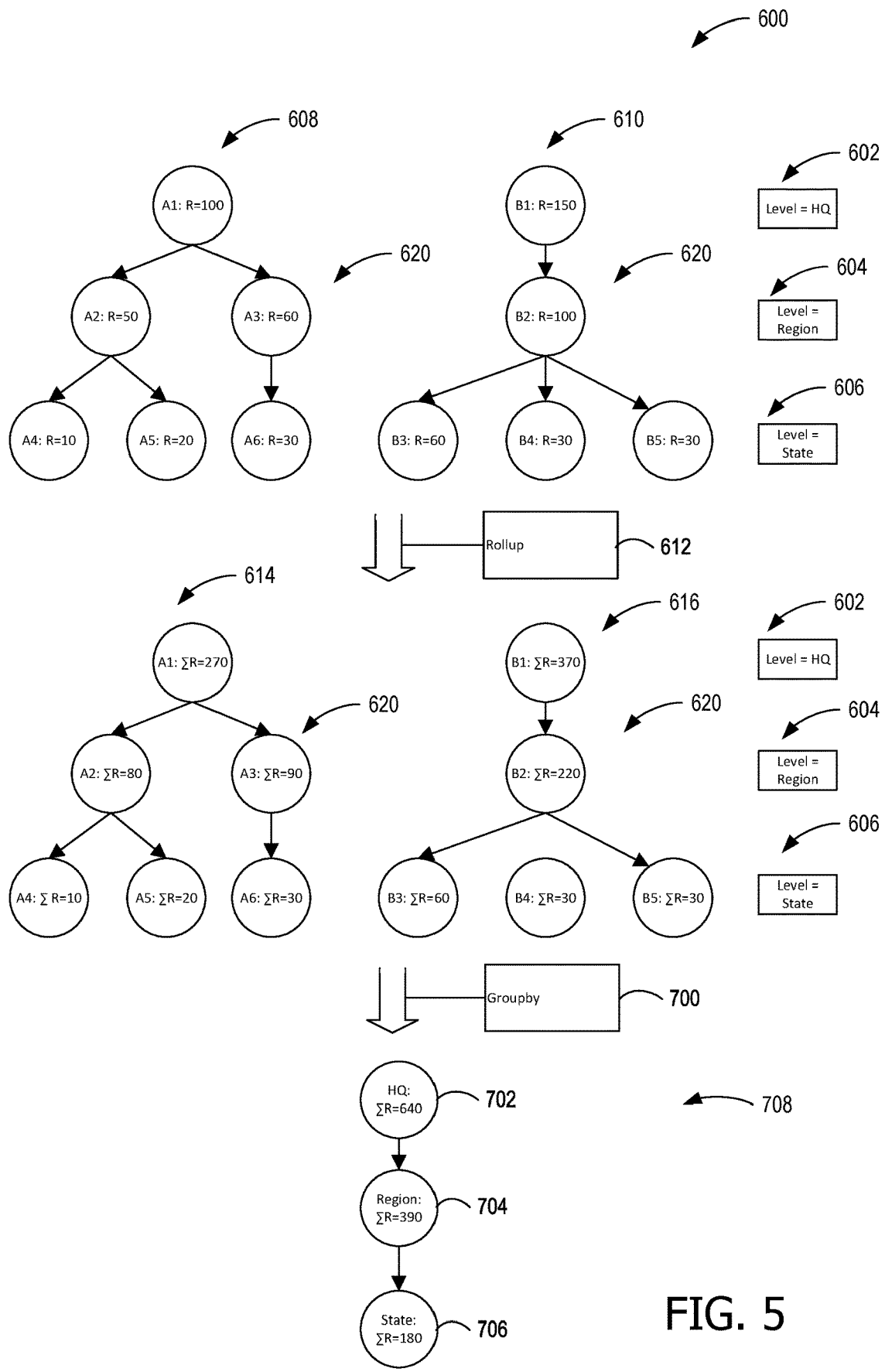
FIG. 5 illustrates another example measure operation.

FIG. 5 illustrates a grouping (Groupby) operation 700 that is performed after the rollup operation 612. In particular, a measure operation 708 that is a business measure operation with hierarchy is performed after the measure operation 600. In this example, the measure operation 708 is a sum of revenue with a rollup to level. In the measure operation 708, a grouping operation is performed on the aggregated data values (from the measure operation 600). The grouping operation aggregates data values of the nodes 620 at each level 602, 604, 606 of the plurality of dimensions, such that updated nodes 702, 704, 706 are output that represent the aggregated total of the revenue at each level. The aggregated total at each level 602, 604, 606 is an aggregation (sum) of the revenue values of the nodes 620 at each level 602, 604, 606 after the measure operation 600 is performed with the rollup operation 612. That is, the updated data of the nodes 702, 704, 706 represent the total revenue for each level 602, 604, 606 (dependent also on lower levels as determined by the operation 600) of the combined data corresponding to the hierarchies 608, 610. Thus, the measure operation 600 is a vertical rollup and the measure operation 708 is a horizontal rollup.

Figure 6:
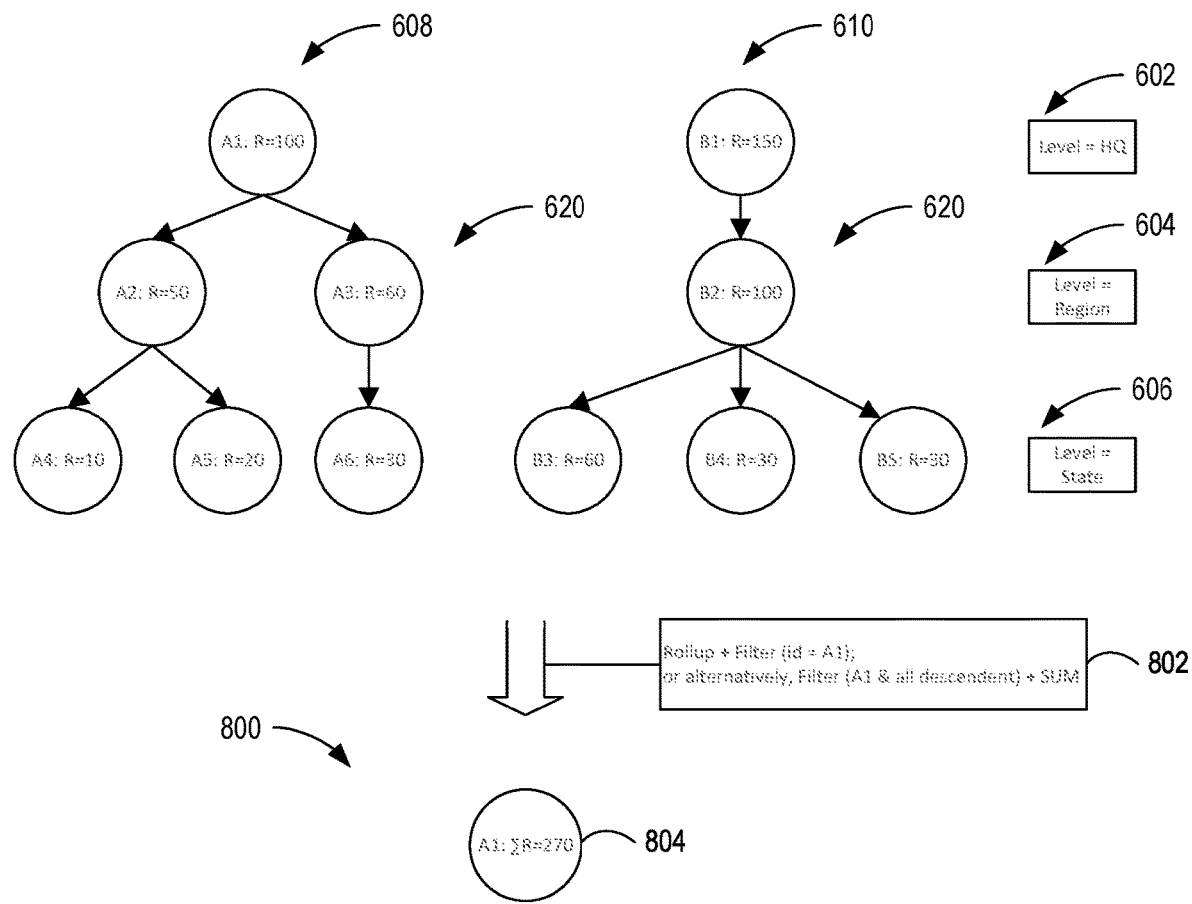
FIG. 6 illustrates another example measure operation.

FIG. 6 illustrates a measure operation 800 that includes a rollup and filter (rollup+filter) operation 802. In particular, the measure operation 800 is a business measure operation with hierarchy that is a sum of revenue rollup that is filtered for a particular node 620 (e.g., an account ID). For example, the measure operation 800 is a filter on ID operation that returns only required or desired account information (e.g., revenue data for a particular business unit, in this example HQ A1). In some examples, the filtering operation is performed based on a user input (selecting an ID of interest), and in response to performing the filtering operation (e.g., the combined rollup and filter operation 802), a node 804 with an aggregated value based on a subset of nodes 620 corresponding to a rollup operation for only the particular node (A1) in the hierarchy 608 is output. The output data at node 804 corresponds to data in the A1 node after the rollup operation 612 is performed (see FIGS. 5 and 6). Only data corresponding to a particular node 620 can be selected for output (e.g., perform a filter operation after rollup to provide specific requested information), in this example. It should be noted that instead of performing a Rollup+Filter (id=A1) operation, in some examples, a Filter (A1 & all descendants)+SUM operation is performed to achieve the same result.

Figure 7:
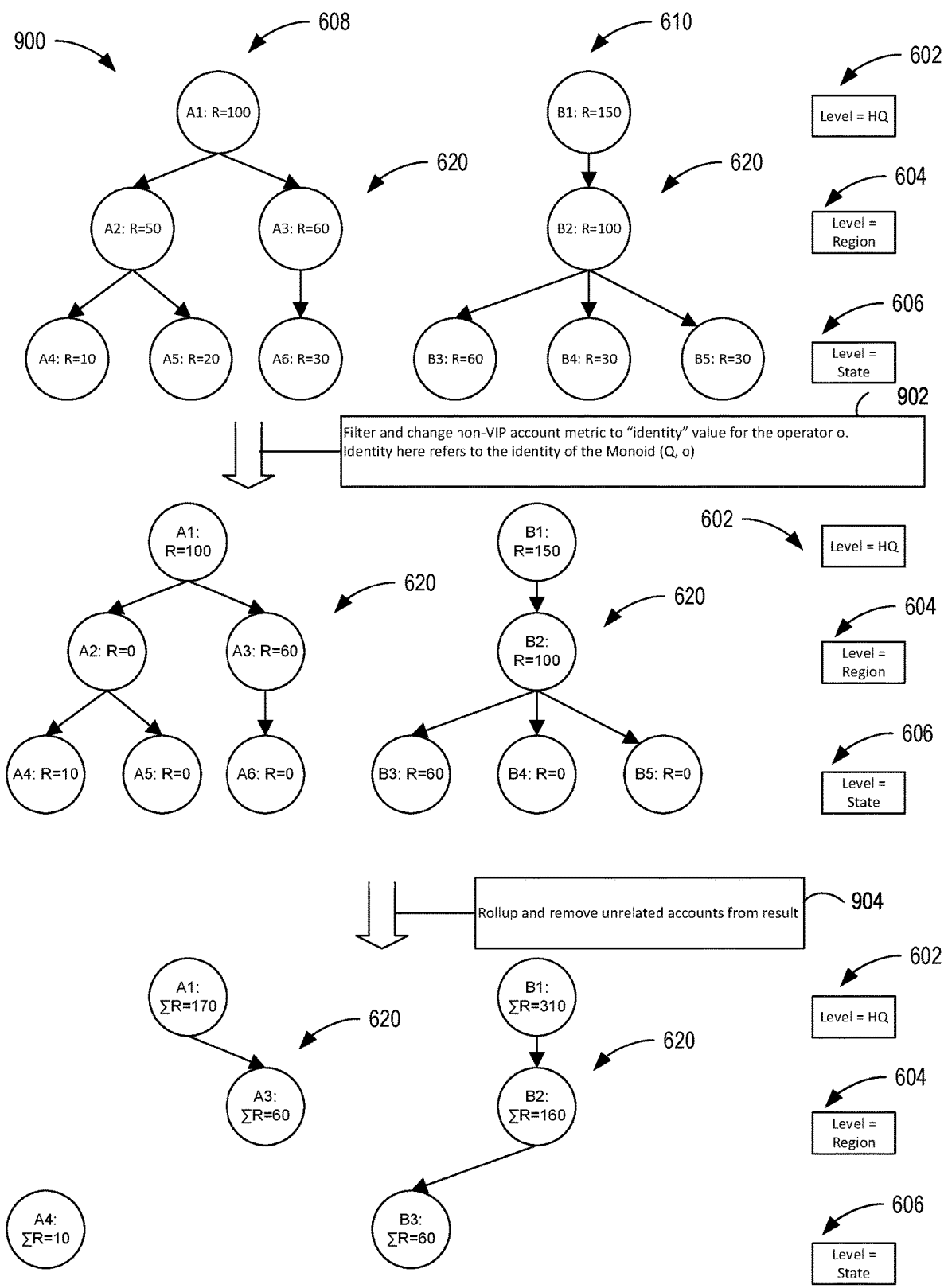
FIG. 7 illustrates another example measure operation.

FIG. 7 illustrates a measure operation 900 that includes a filtering operation before a rollup operation. In particular, the measure operation 900 is a profile measure operation with hierarchy that is a sum of revenue rollup to each account that has a particular status or designation (e.g., VIP designation for higher revenue accounts). In this example, specific nodes 620 are selected as having a higher status or increased importance, which are the following nodes 620: A1, A3, A4, B1, B2, and B3. Thus, in this example, the measure operation 900 is to be performed only on the VIP designed nodes 620.

In particular, the measure operation 900 includes performing a filtering operation to reset a value of one or more nodes 620 from the rollup operation based on a user input before performing the rollup operation. That is, the non-VIP designated nodes 620 (i.e., nodes A2, A5, A6, B4, and B5) are filtered with these nodes 620 having a corresponding metric changed to "identify", which in this example the "identity" value for the operator is zero (i.e., revenue R=0). In the illustrated example, a filter and change operation 902 is performed to set the revenue value of the non-VIP designated nodes to zero. It should be noted that identity refers to the identity of the monoid (Q,o), wherein Q denotes the domain of values of interest (e.g., rational numbers or bounded rational numbers), and o is the operator. As such, because (Q,o) is a monoid, there exists an identity value in Q that can be used for the measure. As should be appreciated, a filter and rollup operation cannot be performed with on operator o, where (Q,o) is not a monoid. After performing the filter and change operation 902, a rollup and remove operation 904 is performed, which in some examples includes the rollup operation 612 being performed followed by removing the nodes 620 having the "identity" value. Thus, as can be seen, the number of node 620 is reduced in this measure operation 900 from eleven nodes 620 to a subset of six nodes 620.

Thus, in the measure operation 900, each node 620 is "tagged" or identified as VIP or not VIP, such that a prefilter on the accounts is performed to select the VIP accounts before performing the rollup. It should be noted that if the non-VIP nodes 620 were initially removed, there would be missing links because of the prefilter. As such, the value of each unselected node (e.g., nodes that do not satisfy the filter criteria) is set to zero (e.g., using monoids, set the identity value for the sum value to zero). As a result, all nodes 620 are maintained in the hierarchies 608, 610 before the rollup operation 612 is performed, thereby maintaining the relationships or links (e.g., parent-child relationship) between the nodes 620. Thereafter, the unselected nodes 620 are removed.

Figure 8:
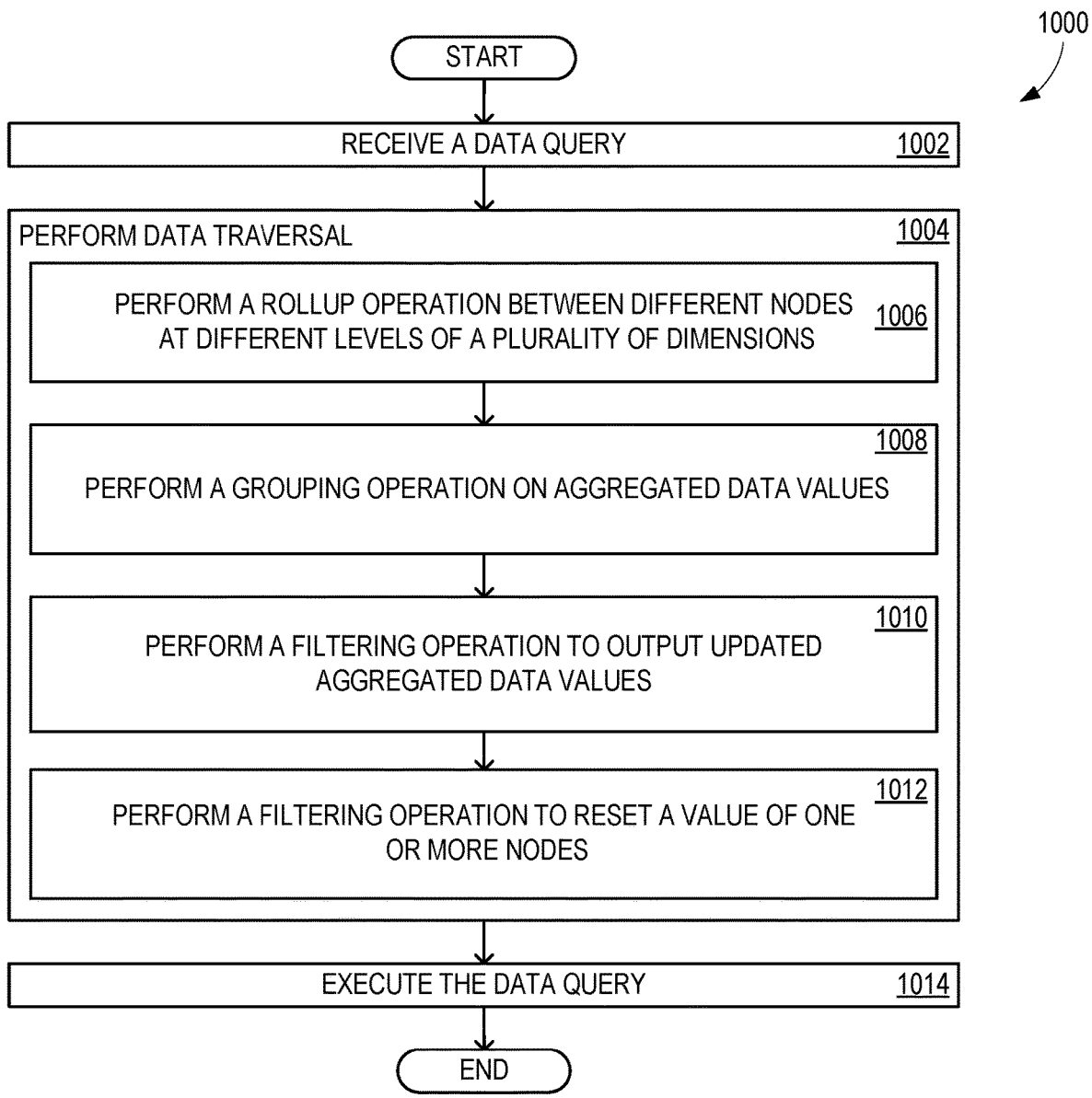
FIG. 8 is a flowchart illustrating example operations to perform a data query.

FIG. 8 is a flowchart 1000 illustrating exemplary operations involved in controlling data in a hierarchy, for example, to perform a SQL query. In some examples, the operations described for flowchart 1000 are performed by the computing device 1100 of FIG. 9. The flowchart 1000 commences with operation 1002, which includes receiving a data query. In some examples, a SQL query with respect to data having different hierarchical structures is received. For example, a data query corresponding to data organized within nodes in a data hierarchy is received, wherein the data hierarchy is defined by a plurality of dimensions (e.g., levels).

Operation 1004 includes data traversal, such as to facilitate segment and measure building. In the illustrated example, operation 1004 comprises one or more of operations, 1006, 1008, 1010, 1012. In particular, operation 1006 includes performing a rollup operation between different nodes at different levels of the plurality of dimensions. As described in more detail herein, the rollup operation aggregates the data values of the nodes at the different levels (e.g., see FIG. 4). Operation 1008 includes performing a grouping operation on the aggregated data values. As described in more detail herein, the grouping operation aggregates data values of the nodes at each level of the plurality of dimensions (e.g., see FIG. 5). Operation 1010 includes performing a filtering operation based on a user input, and in response to performing the filtering operation, outputting an updated aggregated value based on a subset of nodes (e.g., see FIG. 6). For example, a post-filtering operation is performed after rollup is performed. Operation 1012 includes performing a filtering operation to reset a value of one or more nodes from the rollup operation based on a user input before performing the rollup operation (e.g., see FIG. 7). For example, a pre-filtering operation is performed before rollup is performed. Combinations or operations 1006, 1008, 1010, and 1012 are contemplated. Operation 1014 includes executing the data query, which results in various examples with outputting an aggregated value for different nodes based on the operations and optional filtering performed.

Thus, various examples control data in a hierarchy, such as for performing a data hierarchy search. For example, one or more rollup operations in combination with data filtering allows for more efficient query processing (e.g., graph traversal in a SQL query).

Example Operating Environment

Figure 9:
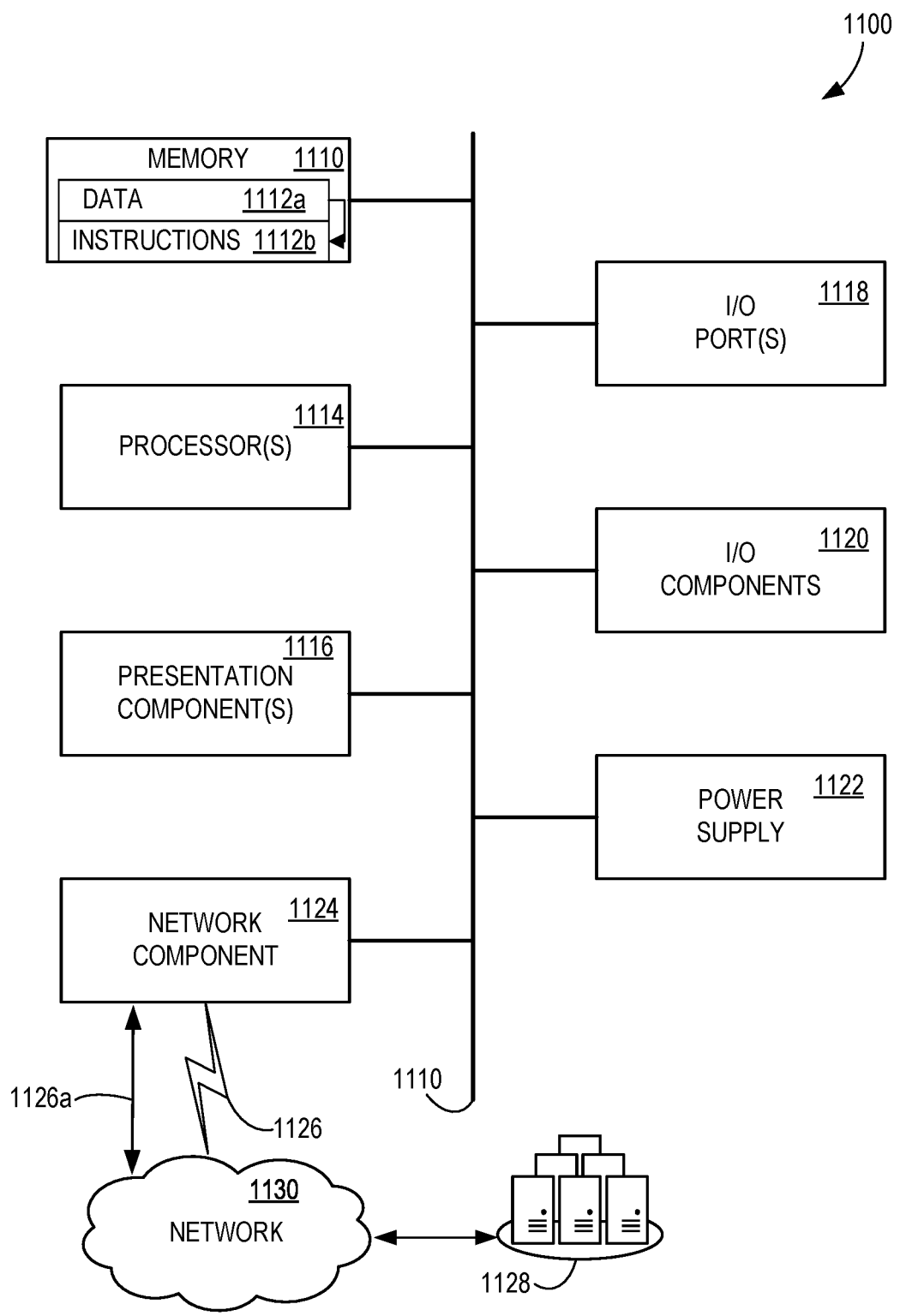
FIG. 9 is a block diagram of an example computing environment suitable for implementing some of the various examples disclosed herein.

FIG. 9 is a block diagram of an example computing device 1100 for implementing aspects disclosed herein, and is designated generally as the computing device 1100. The computing device 1100 is but one example of a suitable computing environment and is not intended to suggest any limitation as to the scope of use or functionality of the examples disclosed herein. Neither should the computing device 1100 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

The computing device 1100 includes a bus 1110 that directly or indirectly couples the following devices: computer-storage memory 1112, one or more processors 1114, one or more presentation components 1116, I/O ports 1118, I/O components 1120, a power supply 1122, and a network component 1124. While the computing device 1100 is depicted as a single device, multiple computing devices 1100 may work together and share the depicted device resources. For example, the memory 1112 may be distributed across multiple devices, and the processor(s) 1114 may be housed with different devices.

The bus 1110 represents what may be one or more busses (such as an address bus, data bus, or a combination thereof). Although the various blocks of FIG. 9 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 9 and the references herein to a "computing device." The memory 1112 may take the form of the computer-storage media references below and operatively provide storage of computer-readable instructions, data structures, program modules and other data for the computing device 1100. In some examples, the memory 1112 stores one or more of an operating system, a universal application platform, or other program modules and program data. The memory 1112 is thus able to store and access data 1112a and instructions 1112b that are executable by the processor 1114 and configured to carry out the various operations disclosed herein.

In some examples, the memory 1112 includes computer-storage media in the form of volatile and/or nonvolatile memory, removable or non-removable memory, data disks in virtual environments, or a combination thereof. The memory 1112 may include any quantity of memory associated with or accessible by the computing device 1100. The memory 1112 may be internal to the computing device 1100 (as shown in FIG. 9), external to the computing device 1100 (not shown), or both (not shown). Examples of the memory 1112 in include, without limitation, random access memory (RAM); read only memory (ROM); electronically erasable programmable read only memory (EEPROM); flash memory or other memory technologies; CD-ROM, digital versatile disks (DVDs) or other optical or holographic media; magnetic cassettes, magnetic tape, magnetic disk storage or other magnetic storage devices; memory wired into an analog computing device; or any other medium for encoding desired information and for access by the computing device 1100. Additionally, or alternatively, the memory 1112 may be distributed across multiple computing devices 1100, for example, in a virtualized environment in which instruction processing is carried out on multiple devices 1100. For the purposes of this disclosure, "computer storage media," "computer-storage memory," "memory," and "memory devices" are synonymous terms for the computer-storage memory 1112, and none of these terms include carrier waves or propagating signaling.

The processor(s) 1114 may include any quantity of processing units that read data from various entities, such as the memory 1112 or I/O components 1120. Specifically, the processor(s) 1114 are programmed to execute computer-executable instructions for implementing aspects of the disclosure. The instructions may be performed by the processor 1114, by multiple processors within the computing device 1100, or by a processor external to the computing device 1100. In some examples, the processor(s) 1114 are programmed to execute instructions such as those illustrated in the flow charts discussed below and depicted in the accompanying drawings. Moreover, in some examples, the processor(s) 1114 represent an implementation of analog techniques to perform the operations described herein. For example, the operations may be performed by an analog client computing device 1100 and/or a digital client computing device 1100. The presentation component(s) 1116 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between the computing devices 1100, across a wired connection, or in other ways. The I/O ports 1118 allow the computing device 1100 to be logically coupled to other devices including the I/O components 1120, some of which may be built in. Example I/O components 1120 include, for example but without limitation, a microphone, joystick, game pad, satellite dish, scanner, printer, wireless device, etc.

The computing device 1100 may operate in a networked environment via the network component 1124 using logical connections to one or more remote computers. In some examples, the network component 1124 includes a network interface card and/or computer-executable instructions (e.g., a driver) for operating the network interface card. Communication between the computing device 1100 and other devices may occur using any protocol or mechanism over any wired or wireless connection. In some examples, network component 1124 is operable to communicate data over public, private, or hybrid (public and private) using a transfer protocol, between devices wirelessly using short range communication technologies (e.g., near-field communication (NFC), Bluetooth™ branded communications, or the like), or a combination thereof. The network component 1124 communicates over wireless communication link 1126 and/or a wired communication link 1126a to a cloud resource 1128 across the network 1130. Various different examples of communication links 1126 and 1126a include a wireless connection, a wired connection, and/or a dedicated link, and in some examples, at least a portion is routed through the internet.

Although described in connection with an example computing device 1100, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

Other examples include the following.

A system for controlling data in a hierarchy, the system comprising:
- a processor; and
- a computer-readable medium storing instructions that are operative upon execution by the processor to:
- receive a data query corresponding to data organized within nodes in a data hierarchy, wherein the data hierarchy is defined by a plurality of dimensions;
- perform a data traversal of the data hierarchy including a rollup operation between different nodes at different levels of the plurality of dimensions, the rollup operation aggregating data values of the nodes at the different levels;
- output aggregated values for different nodes at each level based on the rollup operation; and
- execute the data query using the aggregated values for the different nodes.

A computerized method for controlling data in a hierarchy, the computerized method comprising:
- receiving a data query corresponding to data organized within nodes in a data hierarchy, wherein the data hierarchy is defined by a plurality of dimensions;
- performing a data traversal of the data hierarchy including a rollup operation between different nodes at different levels of the plurality of dimensions, the rollup operation aggregating data values of the nodes at the different levels;
- outputting aggregated values for different nodes at each level based on the rollup operation; and
- executing the data query using the aggregated values for the different nodes One or more computer storage devices having computer-executable instructions stored thereon, which, on execution by a computer, cause the computer to perform operations comprising:
- receiving a data query corresponding to data organized within nodes in a data hierarchy, wherein the data hierarchy is defined by a plurality of dimensions;
- performing a data traversal of the data hierarchy including a rollup operation between different nodes at different levels of the plurality of dimensions, the rollup operation aggregating data values of the nodes at the different levels;
- outputting aggregated values for different nodes at each level based on the rollup operation; and
- executing the data query using the aggregated values for the different nodes Alternatively, or in addition to the other examples described herein, examples include any combination of the following:
- further comprising performing a grouping operation on the aggregated values, the grouping operation aggregating data values of the nodes at each level of the plurality of dimensions.
- further comprising performing a filtering operation based on a user input, and in response to performing the filtering operation, outputting an updated aggregated value based on a subset of nodes.
- further comprising performing a filtering operation to reset a value of one or more nodes from the rollup operation based on a user input before performing the rollup operation.
- further comprising resetting the value of the one or more nodes to zero using monoids before performing the rollup operation and remove the one or more nodes from the data hierarchy after performing the rollup operation.
- further comprising computing one or more segments and measures with the data traversal of the data, wherein the data is stored in one of a relational database and a graph database.
- wherein the nodes are arranged in a parent-child relationship among a plurality of entities within the data hierarchy.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C." The phrase "and/or", as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one implementation, to A only (optionally including elements other than B); in another implementation, to B only (optionally including elements other than A); in yet another implementation, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of" or, when used in the claims, "consisting of" will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of" "only one of" or "exactly one of" "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described aspects of the various examples in detail, it will be apparent that modifications and variations are possible without departing from the scope of aspects as defined in the appended claims. As various changes could be made in the above constructions, products, and methods without departing from the scope of aspects describe herein, it is intended that all matter contained in the above description and shown in the accompanying drawings shall be interpreted as illustrative and not in a limiting sense.

What is claimed is:

1. A system comprising:
a processor; and
a non-transitory computer-readable storage medium storing instructions that are operative upon execution by the processor to:
receive a data query corresponding to data organized in a plurality of data entities as nodes in a data hierarchy, the data hierarchy having a plurality of dimensions;
perform a filter and change operation for resetting a value of one or more of the nodes from a rollup operation based on a user input before performing the rollup operation, the value of the one or more of the nodes being reset to zero using a monoid before performing the rollup operation;
perform a rollup and remove operation for removing the one or more of the nodes having the value reset to zero from the data hierarchy after performing the rollup operation;
perform a graph traversal of the plurality of data entities used in the data query, the graph traversal including the rollup operation, without a self-joining operation, between different nodes at different levels of the plurality of dimensions, the rollup operation comprising a first rollup between the different levels in the data hierarchy and a second rollup within each level of the data hierarchy between the different nodes across the plurality of data entities, the rollup operation aggregating data values of the nodes at the different levels;
output aggregated values for the different nodes at each level based on the rollup operation;
execute the data query using the aggregated values for the different nodes; and
produce an aggregated result based on the execution of the data query.

2. The system of claim 1, wherein the instructions are further operative to perform a grouping operation on the aggregated values, the grouping operation aggregating data values of the nodes at each level of the plurality of dimensions.

3. The system of claim 1, wherein the instructions are further operative to perform the filtering operation based on the user input, and in response to performing the filtering operation, outputting an updated aggregated value based on a subset of nodes.

4. The system of claim 1, wherein the instructions are further operative to use the aggregated result as feedback in a next loop of the rollup operation or the filtering.

5. The system of claim 1, wherein the aggregated result is stored in a database as a new data entity, wherein the instructions are further operative to use the new data entity for a subsequent data query.

6. The system of claim 1, wherein the data query is received by a single query engine communicating with a relational database and a graph database, the data being stored in the relational database and the graph database, wherein the single query engine integrates the relational database and the graph database to handle compute operations, and the instructions are further operative to compute one or more segments and measures with the graph traversal of the data.

7. The system of claim 6, the integration of the relational database and the graph database to handle compute operations reducing hierarchy aggregation.

8. A computerized method comprising:
receiving a data query corresponding to data organized in a plurality of data entities as nodes in a data hierarchy, the data hierarchy having a plurality of dimensions;
performing a filter and change operation for resetting a value of one or more of the nodes from a rollup operation based on a user input before performing the rollup operation, the value of the one or more of the nodes being reset to zero using a monoid before performing the rollup operation;
performing a rollup and remove operation for removing the one or more of the nodes having the value reset to zero from the data hierarchy after performing the rollup operation;
performing a graph traversal of the plurality of data entities used in the data query, the graph traversal including the rollup operation, without a self-joining operation, between different nodes at different levels of the plurality of dimensions, the rollup operation comprising a first rollup between the different levels in the data hierarchy and a second rollup within each level of the data hierarchy between the different nodes across the plurality of data entities, the rollup operation aggregating data values of the nodes at the different levels;
outputting aggregated values for the different nodes at each level based on the rollup operation;
executing the data query using the aggregated values for the different nodes; and
producing an aggregated result based on the execution of the data query.

9. The computerized method of claim 8, further comprising performing a grouping operation on the aggregated values, the grouping operation aggregating data values of the nodes at each level of the plurality of dimensions.

10. The computerized method of claim 8, further comprising performing the filtering operation based on the user input, and in response to performing the filtering operation, outputting an updated aggregated value based on a subset of nodes.

11. The computerized method of claim 8, further comprising using the aggregated result as feedback in a next loop of the filtering.

12. The computerized method of claim 8, wherein the aggregated result is stored in a database as a new data entity that is used for a subsequent data query.

13. The computerized method of claim 8, further comprising computing one or more segments and measures with the graph traversal of the data, wherein the data is stored in a relational database and a graph database.

14. The computerized method of claim 8, further comprising using the aggregated result as feedback in a next loop of the rollup operation.

15. A non-transitory computer-readable storage medium having computer-executable instructions stored thereon, which, on execution by a computer, cause the computer to perform operations comprising:
receiving a data query corresponding to data organized in a plurality of data entities as nodes in a data hierarchy, the data hierarchy having a plurality of dimensions;
performing a filter and change operation for resetting a value of one or more of the nodes from a rollup operation based on a user input before performing the rollup operation, the value of the one or more of the nodes being reset to zero using a monoid before performing the rollup operation;
performing a rollup and remove operation for removing the one or more of the nodes having the value reset to zero from the data hierarchy after performing the rollup operation;
performing a graph traversal of the plurality of data entities used in the data query, the graph traversal including the rollup operation, without a self-joining operation, between different nodes at different levels of the plurality of dimensions, the rollup operation comprising a first rollup between the different levels in the data hierarchy and a second rollup within each level of the data hierarchy between the different nodes across the plurality of data entities, the rollup operation aggregating data values of the nodes at the different levels;
outputting aggregated values for the different nodes at each level based on the rollup operation; and
executing the data query using the aggregated values for the different nodes.

16. The non-transitory computer-readable storage medium of claim 15, wherein the operations further comprise performing a grouping operation on the aggregated values, the grouping operation aggregating data values of the nodes at each level of the plurality of dimensions.

17. The non-transitory computer-readable storage medium of claim 15, wherein the operations further comprise performing the filtering operation based on the user input, and in response to performing the filtering operation, outputting an updated aggregated value based on a subset of nodes.

18. The non-transitory computer-readable storage medium of claim 15, wherein the operations further comprise using the aggregated values as feedback in a next loop of the rollup operation or the filtering.

19. The non-transitory computer-readable storage medium of claim 15, wherein the aggregated values are stored in a database as a new data entity that is used for a subsequent data query.

20. The non-transitory computer-readable storage medium of claim 15,
wherein the data query is received by a single query engine communicating with a relational database and a graph database, the data being stored in the relational database and the graph database, the single query engine integrating the relational database and the graph database to handle compute operations, and
the operations further comprise computing one or more segments and measures with the graph traversal of the data.

* * * * *